Sept. 17, 1929.   A. ARATO   1,728,818
STEERING GEAR FOR TRAILED VEHICLES
Filed Dec. 16, 1927   2 Sheets-Sheet 2

Inventor:
A. Arato.

Patented Sept. 17, 1929

1,728,818

UNITED STATES PATENT OFFICE

ACHILLE ARATO, OF TURIN, ITALY

STEERING GEAR FOR TRAILED VEHICLES

Application filed December 16, 1927, Serial No. 240,592, and in Germany December 23, 1926.

This invention relates to steering gears for vehicles which are trailed by a trailing vehicle, directed to cause the trailed vehicle wheels to be steered to follow the path of the trailing vehicle when the vehicle train is in a turn, and has for its object means for holding resiliently the steering wheels of the trailed vehicle in their mean or straight running position, as well as means for connecting with lost motion the wheel controlling members provided at the ends of the trailed vehicle.

Figure 1:
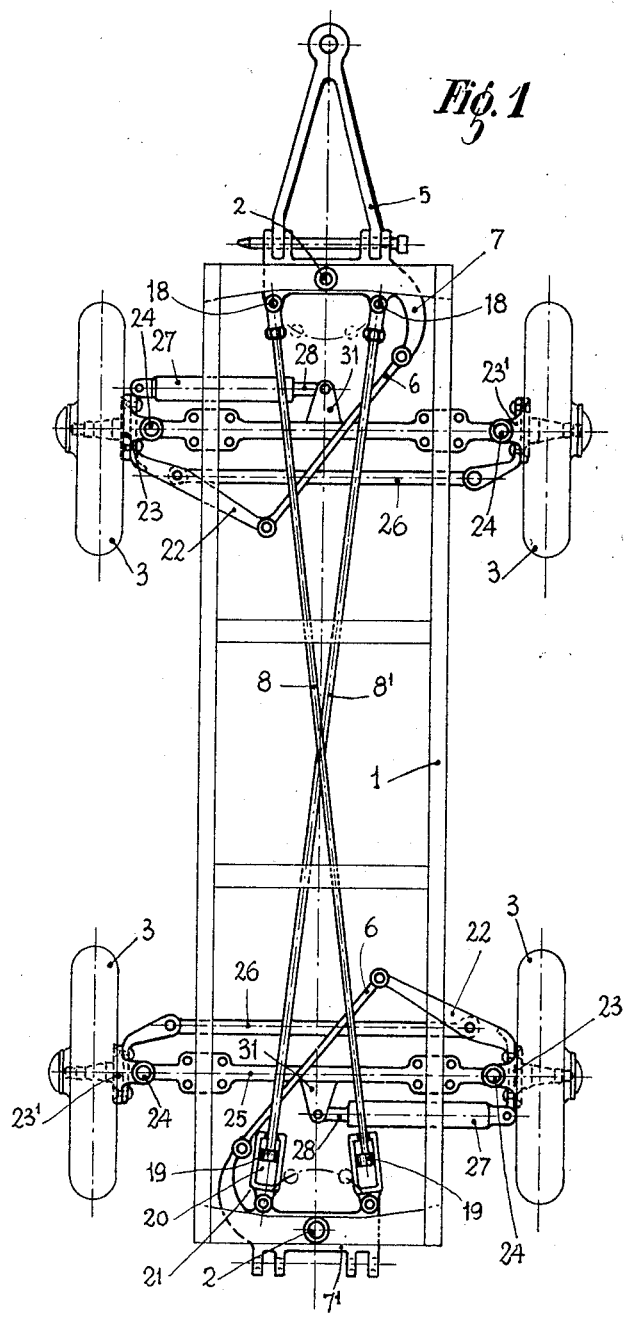
Figure 2:
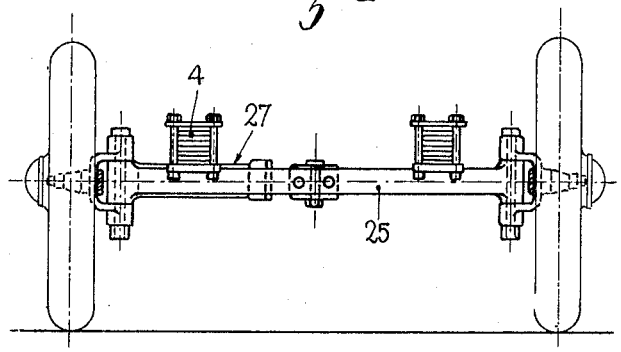
Figure 3:
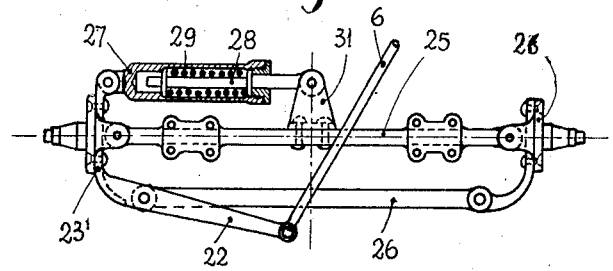
Figure 4:
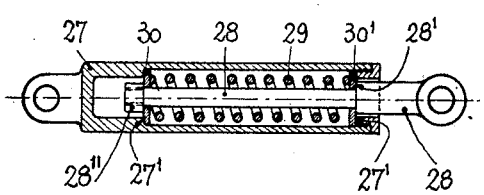

On the annexed drawings is shown by way of example an embodiment of the present invention and Figure 1 is a plan view of the trailed vehicle, Figure 2 is a front view of a pair of wheels, Figure 3 is a detail plan section of a separate steering gear, and Figure 4 is a detail showing separately a resilient member embodied in the constructions.

As shown on the drawings, the car frame is mounted by springs 4 on axles 25 having pivoted at each end, at 24, a steering fuse 23—23' carrying a wheel 3.

Rocking yokes 7 and 7' are pivoted at 2 at the two ends of the frame 1 and said yokes are interconnected by means of crossing rods 8—8' each having one end articulated at 18 on one of said yokes and its other end provided with an enlarged head 19 engaged in slot 20 of a frame 21 articulated on the other rocking yoke 7'.

Each of rocking yokes 7—7' is connected by a rod 6 with an arm 22 solid with the steering fuse 23 of one wheel 3 of a pair. Other wheels are carried by steering fuses 23'.

The fuses 23—23' of the wheels of each pair are pivoted at 24 on the ends of the respective axle 25 and are interconnected by a link 26.

One of the wheel fuses of each pair of wheels, as 23, is connected with one end of a resilient member 27 hereinafter described in detail whose opposite end is connected with a part 31 fastened on the respective axle 25.

In the preferred construction the resilient member 27 is connected with the wheel fuse 23 having arm 22 solid therewith.

As shown in Figure 4, the resilient member comprises a hollow cylindrical body 27 in which extends a stem 28 embraced by a coil spring 29. The ends of said spring 29 bear on collars 30—30' each of which abuts on a shoulder 27' of the body 27 and on a shoulder 28' or a nut 28" of stem 28, the said spring being thus compressed by displacement of body 27 with respect to stem 28 whatever is the direction in which said displacement takes place.

In operation when the pole bar 5 of the trailed vehicle which is connected with the yoke 7 is moved from its mean or straight running position shown in Figure 1, it actuates yoke 7 and rod 6 and swings arm 22 which in turn is solid with the fuse 23 of one of the wheels 3 and produces directly the steering motion of said wheel and further steers also the other wheel of the same pair through link 26. The steering motion of the wheel fuse 23 to which the resilient member 27 is connected causes said member to be deformed and the spring 29 to be compressed.

The spring 29 is thus in condition to resiliently oppose the deviations of the pole member and to carry it back in its mean or straight running position.

The deviation of the pole member and of the cooperating rocking member 7 is not imparted to the rear rocking yoke 7' until either of heads 19 of the ends of rods 8—8' reaches the end of the slot 20 of cooperating frame 19; when also the rear yoke is moved the resilient member 27 of the rear pair of wheels is made operative said member carrying its associate wheels in their mean or straight running position as soon as the action of rods 8—8' is released.

By the described arrangement the wheels are resiliently held in their normal or straight running position and the rear trailed vehicle wheels are steered only when a substantial steering motion of front wheels occurs, thus leaving ineffective the small oscillations of the pole bar and front wheels due to unevenness of the road.

What I claim as my invention and desire to secure by United States Letters Patent is:—

1. In a trailed vehicle, a frame, axles connected with said frame, steering members on said axles, wheels each mounted on one of said steering members, steering arms each solid with one of said steering members, links each interconnecting said steering arms of one axle, swinging yokes each at one end of said frame, rods interconnecting said yokes with lost motion and crossing each other, a pole member connected with one of said swinging yokes, rods each connecting one of said yokes with one of said steering arms of the adjacent axle, and resilient members each having one end connected with said frame and its other end connected with one of the said steering wheel supporting members and associate steering arm.

2. In a trailed vehicle, a frame, axle connected with said frame, steering members on said axles, wheels each mounted on one of said steering members, links each interconnecting said steering members of the wheels of each axle, swinging yokes each at one end of said frame, rods interconnecting said yokes with lost motion and crossing each other, a pole member connected with one of said swinging yokes, rods each connecting one of said yokes with one of said steering members of the adjacent axle, members each connected with said frame, parts each connected with one of said wheel steering and supporting members and movable with respect to one of last named members and resilient parts each intermediate one of said parts and associate member.

3. In a trailed vehicle, a frame, axles connected with said frame, steering members on said axles, wheels each mounted on one of said steering members, steering arms each solid with one of said steering members, links each interconnecting said steering arms of one axle, swinging yokes each at one end of said frame, rods interconnecting said yokes with lost motion and crossing each other, a pole member connected with one of said swinging yokes, rods each connecting one of said yokes with one of said steering arms of the adjacent axle, members each connected with said frame, parts each connected with one of said steering and supporting members and movable with respect to one of last named members and resilient parts each intermediate one of said parts and its associate member.

4. In a trailed vehicle, a frame, axles connected with said frame, steering members on said axles, wheels each mounted on one of said steering members, links each interconnecting said steering members of the wheels of each axle, swinging yokes each at one end of said frame, rods interconnecting said yokes with lost motion and crossing each other, a pole member connected with one of said swinging yokes, rods each connecting one of said yokes with one of said steering members of the adjacent axle, and resilient members each comprising a hollow member having end abutments, a stem movable through said hollow member and having abutments and a spring having each of its ends abutting on one of said hollow-member abutments and on the adjacent stem abutment, one of said hollow member and stem being connected with said frame and the other one being connected with one of said wheel steering and supporting members.

5. In a trailed vehicle, a frame, axles connected with said frame, steering members on said axles, wheels each mounted on one of said steering members, links each interconnecting said steering members of the wheels of each axle, swinging yokes each at one end of said frame, rods interconnecting said yokes with lost motion and crossing each other, a pole member connected with one of said swinging yokes, rods each connecting one of said yokes with one of said steering members of the adjacent axle, and resilient members each comprising a hollow member having end abutments, a stem movable through said hollow member and having abutments, two collars each engaging one of said hollow member abutments and the adjacent one of said stem abutments and a spring located intermediate said collars, one of said hollow members and stem being connected with said frame and the other one being connected with one of said wheel steering and supporting members.

6. In a trailed vehicle, a frame, axles connected with said frame, steering members on said axles, wheels each mounted on one of said steering members, links each interconnecting said steering members of the wheels of each axle, swinging yokes each at one end of said frame, rods crossing each other and each having one end pivoted on one of said yokes at opposite sides of its rocking centre, an enlarged head at the free end of each of said rods, parts pivoted on the other one of said yokes at opposite sides of the rocking centre of the same and having slots in each of which one of said rod heads is engaged with lost motion, a pole member connected with one of said swinging yokes, rods each connecting one of said yokes with one of said steering members of the adjacent axle, and resilient members each having one end connected with said frame and its other end connected with one of said wheel steering and supporting members.

7. In a trailed vehicle, a frame, axles connected with said frame, steering members on said axles, wheels each mounted on one of said steering members, links each interconnecting said steering members of the wheels of each axle, swinging yokes each at one end of said frame, rods crossing each other and each having one end pivoted on one of said yokes at opposite sides of the rocking centre of the same, an enlarged head at the free end of each of said rods, parts pivoted on the other one of said yokes at opposite sides of the rocking centre of the same and having slots in each of which one of said enlarged heads is engaged with lost motion, a pole member connected with one of said swinging yokes, rods each connecting one of said yokes with one of said steering members of the adjacent axle, and resilient members each comprising a hollow member having end abutments, a stem movable through said hollow member and having abutments, and a spring having each of its ends abutting on one of said hollow member abutments and on the adjacent stem abutment, one of said hollow members and stem being connected with said frame and the other one being connected with one of said wheel steering and supporting members.

8. In a trailed vehicle, a frame, axles connected with said frame, steering members on said axles, wheels each mounted on one of said steering members, links each interconnecting said steering members of the wheels of each axle, swinging yokes each at one end of said frame, rods crossing each other and each having one end pivoted on one of said yokes at opposite sides of its rocking centre, an enlarged head at the free end of each of said rods, parts pivoted on the other one of said yokes at opposite sides of the rocking centre of the same and having slots in each of which one of said rod heads is engaged with lost motion, a pole member connected with one of said swinging yokes, rods each connecting one of said yokes with one of said steering members of the adjacent axle, and resilient members each comprising a hollow member having end abutments, a stem movable through said hollow member and having abutments, two collars each engaging one of said hollow member abutments and the adjacent one of said stem abutments and a spring located intermediate said collars, one of said hollow members and stem being connected with said frame and the other one being connected with one of said wheel steering and supporting members.

9. In a trailed vehicle, a frame, axles connected with said frame, steering members on said axles, wheels each mounted on one of said steering members, an arm solid with one of said steering members of each axle and extending in the space intermediate said axles, links each interconnecting said steering member and arm of one of said axles, a swinging yoke at each end of said frame, rods interconnecting said yokes with lost motion and crossing each other, a pole member connected with one of said swinging yokes, a rod connecting each of said yokes with said steering member arm of the adjacent axle, and resilient members each having one end connected with said frame and its other end connected with said steering member arm of the adjacent axle at a point intermediate the cooperating yoke and axle.

10. In a trailed vehicle, a frame, axles connected with said frame, steering members on said axles, wheels each mounted on one of said steering members, an arm solid with one of said steering members of each axle and extending in the space intermediate said axles, links each interconnecting said steering member and arm of one of said axles, a swinging yoke at each end of said frame, rods interconnecting said yokes with lost motion and crossing each other, a pole member connected with one of said swinging yokes, a rod connecting each of said yokes with said steering member arm of the adjacent axle, a hollow member having inward end abutments, a rod movable through said hollow member and having end abutments, collars loose on said rod and engaging the adjacent abutments of said hollow member and rod, and a spring intermediate said collars one of said hollow members and rods movable therein being connected with one of said axles and the other one being connected with one of the steering members of the same axle at a point intermediate said axle and yoke.

11. In a trailed vehicle, a frame, axles connected with said frame, steering members on said axles, wheels each mounted on one of said steering members, steering arms fixed with respect to one of said steering members, links each interconnecting said steering arms of one axle, swinging yokes each at one end of said frame, rods interconnecting said yokes with lost motion and crossing each other, a pole member connected with one of said swinging yokes, rods each connecting one of said yokes with one of said steering arms of the adjacent axle, and resilient members each having one end connected with said frame and its other end connected with one of the said steering wheel supporting members, an associated steering arm, the last named steering arm being located at the opposite side to the point of interconnection of said resilient member and steering wheel supporting member and with respect to centre of steering motion of said steering wheel supporting member.

12. In a trailed vehicle, a frame, axles connected with said frame, steering members on said axles, wheels each mounted on one of said steering members, links each interconnecting said steering members of the wheels of each axle, swinging yokes each at one end of said frame, rods interconnecting said yokes with lost motion and crossing each other, a pole member connected with one of said swinging yokes, rods each connecting one of said yokes with one of said steering members of the adjacent axle, and resilient members each comprising a hollow member having end abutments, a stem movable through said hollow member and having abutments and a spring having each of its ends abutting against one of said hollow-member abutments and on the adjacent stem abutment, one of said hollow members and respective stem being connected with said frame and the other one being connected with one of said wheel steering and supporting members at a point opposite to the point of interconnection between said wheel steering and supporting member and the said yoke connected therewith.

In testimony whereof I have signed my name to this specification.

ACHILLE ARATO.